United States Patent [19]

Mairson

[11] 4,222,272

[45] Sep. 16, 1980

[54] PROCESSOR FOR AN INERTIAL MEASUREMENT UNIT

[75] Inventor: Theodore Mairson, Lexington, Mass.

[73] Assignee: Sanders Associates, Inc., Nashua, N.H.

[21] Appl. No.: 890,354

[22] Filed: Mar. 27, 1978

[51] Int. Cl.² ............................................. G01P 15/08
[52] U.S. Cl. .................................. 73/517 R; 364/453; 364/565
[58] Field of Search ............. 73/510, 514, 515, 516 R, 73/516 LM, 517 R, 517 B, 178 R; 364/453, 565, 566, 720, 454

[56] References Cited

U.S. PATENT DOCUMENTS

| | | | |
|---|---|---|---|
| 2,365,218 | 12/1944 | Rogers | 73/659 |
| 3,014,374 | 12/1961 | Johnston | 73/517 R |
| 3,253,471 | 5/1966 | Maillard | 73/517 R X |
| 3,269,179 | 8/1966 | Anderson | 73/178 R |
| 3,304,786 | 2/1967 | Granqvist | 73/517 R |
| 3,545,266 | 12/1970 | Wilson | 235/453 X |
| 3,597,598 | 8/1971 | McAllister | 73/178 R X |

OTHER PUBLICATIONS

"Measurement of Angular Velocity . . . ," by V. Krishnan from Journal of the Franklin Institute, vol. 280, No. 4, pp. 307–315, Oct. 1965.

*Primary Examiner*—Jerry W. Myracle
*Attorney, Agent, or Firm*—Louis Etlinger; Richard I. Seligman

[57] ABSTRACT

A processor is provided for an inertial measurement unit which computes its angular velocity and translational acceleration in terms of dynamic variables chosen because they uniquely define the motion of the inertial measurement unit in terms of linear combinations of the outputs of the transducers used in the inertial measurement unit. In one embodiment, the processor includes a demodulator for obtaining d.c., in-phase and quadrature sets of signals from the outputs of the transducers, a combining circuit for deriving some of the dynamic variables from the in-phase and quadrature sets of signals, and a microprocessor for transforming the dynamic variables into angular velocity and translational acceleration vectors. The processor is used with a small rugged, precise inertial measurement unit in which vector components are measured by the use of accelerometers fixed in a spinning rotor, at least one of which is off-set from the rotor axis and has a sensitive axis parallel to that of the rotor. This off-set/parallel accelerometer permits obtaining the signs of the angular velocities in addition to their magnitudes such that complete vector components are obtained. In an alternative embodiment, two orthogonally oriented rotor systems are utilized which permits all a.c. signal processing, thereby eliminating the necessity of d.c. measurements. Error isolation and correction are easily accomplished in a specialized combining circuit which simplifies initial alignment of the instrument. Another alternative embodiment employs three rotors and provides complete redundancy.

17 Claims, 11 Drawing Figures

PROCESSOR FOR AN INERTIAL MEASUREMENT UNIT

FIELD OF THE INVENTION

This invention relates to inertial measurement unit demodulation and signal processing and more particularly to the processing of signals from a unit which utilizes linear accelerometers in a spinning rotor in which at least one of the accelerometers is off-set from the rotor axis and has a sensitive axis parallel thereto.

BACKGROUND OF THE INVENTION

In general, there are inertial measurement units which utilize stored angular momentum to obtain angular velocity such as rate sensors and rate gyros. The purpose of the inertial measurement unit is to measure the motion of a body in inertial space and it may be utilized in guidance systems, auto pilots, or stable platform maintenance.

The problems of the stored angular momentum devices are centered around the size of the device, the sensitivity of the devices due to temperature changes, and ruggedization of the devices. Also, translational acceleration data is not available directly from these devices.

As will be described, the present processor processes signals from an inertial measurement unit of the type described in U.S. Patent Application, Ser. No. 528,243, now abandoned, filed Nov. 29, 1974 by Theodore Mairson and assigned to the assignee hereof. This inertial measurement unit utilizes accelerometers on a spinning rotor, the outputs of which are processed so that both angular velocity and translational velocity vectors are available from one rugged precise device. This uniquely specifies the inertial parameters of the case of the instrument.

It is the purpose of the present invention to provide a processor which, in combination with the above inertial measurement unit, not only provides as an output the angular velocity of the inertial measurement unit, but also provides as an output the translational acceleration of the inertial measurement unit in three orthogonal directions. It is a feature of the subject processor that the angular velocity and translational acceleration of the case in which the rotor is mounted can be determined directly from linear combinations of the outputs of the accelerometers utilized.

In order to utilize linear combinations of accelerometer outputs, it is a further feature of the subject invention that certain "dynamic" variables are utilized. The word "dynamic" is used in the sense of relating to the field of dynamics of moving bodies. The "dynamic" variables chosen have two important properties: first, they uniquely define the motion of the inertial measurement unit in inertial space; and secondly, these dynamic variables are derived through simple linear combinations of transducer outputs. These dynamic variables which have these properties are defined in equations 17-23 hereinafter. Since simple linear combinations yield all the relevant information about the motion of the inertial measurement unit, signal processing is greatly simplified.

In order to be able to perform the above signal processing, it is important that one of the accelerometers have a sensitive axis parallel to that of the rotor and that this axis be off-set therefrom. With utilization of such an accelerometer, it is now possible to obtain not only the signed magnitudes of the components of the angular velocity vector, but to correct these magnitudes by means of a combining network and measurements made by on-axis transducers.

While the equations which govern the physical phenomenon at the points at which acceleration measurements are made have been described in the past, it is important that by selecting particular combinations of the outputs of the transducers used to generate the above-mentioned dynamic variables, linear combinations of the transducer outputs lead directly to vector components. This eliminates complicated processing. This same analysis of the primary equations also leads to matrices in which cross-coupling, position and alignment errors are easily identified and corrected for by the formation of inverse combining matrices. Not only is initial calibration easily accomplished by changing matrix value, but the number of measurements necessary in order to establish the proper calibration is also minimized.

In the one rotor embodiment, four linear accelerometers are used, with three used for a.c. processing and one used to obtain a d.c. measurement of the velocity of the rotor in inertial space. With the parallel/offset transducer used alone, errors would exist due to errors in position, errors in alignment and errors due to cross coupling. With the addition of an accelerometer on the spin axis and having a sensitive axis normal to it, it is possible to correct for errors in translational acceleration caused by errors in position and alignment, and cross coupling. By adding two such transducers with sum and difference processing, it is possible to correct both for translational acceleration errors and errors in angular velocity due to the above factors.

In a second embodiment two rotors are utilized, with one rotor being orthogonally oriented with respect to the other rotor but in the same plane. Each rotor carries only three transducers, with the transducers on one rotor making possible the computation of the speed of the other rotor in inertial space. The reason for the utilization of the two rotor embodiment is that all measurements are taken at the rotational frequency, thereby precluding the necessity of making a d.c. measurement. For complete redundancy, in a third embodiment (not shown), a rotor may be placed in a third mutually orthogonal direction.

In any case, what has been provided is a processor for a small precise rugged unit which provides all necessary inertial measurements by simple processing techniques utilizing linear combinations of transducer outputs.

The subject inertial measurement unit and signal processor may be used anywhere inertial instruments are required such as autopilots, etc., and especially is useful in optically guided artillery shells which utilize canards to guide the shell. In this case, the shell itself forms the rotor and the despun canards form the case.

It is therefore an object of this invention to provide a signal processor for processing signals from an inertial measurement unit in which the processor utilizes a unique set of dynamic variables which describe the movement of the unit in terms of linear combinations of transducer outputs.

It is another object of this invention to provide a system of locating transducers within a rotating body such that inertial measurements are easily obtained through linear processing of the outputs of the transducers;

It is a further object of this invention to provide the combination of a new rugged inertial measurement unit and new signal processor in which angular velocity and translational acceleration vectors for the unit are easily obtained.

It is a still further object of this invention to provide a method and apparatus for processing signals from an inertial measurement unit which employs a linear combining matrix;

It is still another object of this invention to provide an all a.c. signal processing system for an inertial measurement unit in which the measuring of d.c. voltages is eliminated, while at the same time permitting the resolution of the angular velocity vector and the translational acceleration vector of the case housing the spinning rotor of the inertial measurement unit.

It is a still further object of this invention to provide a conveniently adjusted combining matrix and processing unit for an inertial measurement unit.

These and other objects, etc., will be better understood in connection with the following description of several embodiments taken on conjunction with the following drawings:

DETAILED DESCRIPTION

In general, the subject processor takes the a.c. signals from the aforementioned inertial measurement unit, demodulates them to produce d.c. signals, combines them and processes them in a microprocessor so as to obtain the angular velocity and translational acceleration of the inertial measurement unit.

In general, the subject processor is used with an inertial measurement unit having transducers located on a spinning rotor. The placement of these transducers is such that the processing can utilize linear combinations of the transducer outputs. Since the transducers rotate with the rotor, their outputs are a.c. signals and can be characterized as modulation of a carrier having as its frequency the frequency of the rotor with respect to the case in which it rotates. In the present case, demodulation takes 3 forms: low pass filtering, demodulation with respect to an "in-phase" reference signal, and demodulation with respect to a "quadrature" reference signal. The "in-phase" reference signal is a $\cos \phi$ periodic signal, with a frequency equal to that of the rotor. The "quadrature" reference signal is a $-\sin \phi$ periodic signal with a frequency also equal to that of the rotor. Here, $\phi$ is the angle of the rotor with respect to the case. The reason for this type demodulation is to provide direct current signals which may be linearly combined to yield the dynamic variables which uniquely determine the motion of the inertial measurement unit. The $\cos \phi$ and $-\sin \phi$ demodulation is important because in an inertial measurement unit of this type, the equations which define acceleration of a point on the rotor contain the following terms: $\sin \phi$, $\cos \phi$, $\sin 2\phi$, $\cos 2\phi$, and terms in which $\phi$ is not present. Note: the $\sin 2\phi$ and $\cos 2\phi$ terms are ignored as they relate to second order effects and are further rejected by the demodulation.

It is one purpose of the processor to obtain from the outputs of the transducers three separate sets of signals.

The first set of signals represents those terms in which $\phi$ is not present. This set of signals is referred to as the "d.c. set".

The second set of signals is demodulated with respect to a $\cos \phi$ periodic reference signal having a frequency equal to that of the rotor. This second set of signals is referred to as the "in-phase" set. This second set of signals preserves all terms that involve $\cos \phi$ and rejects all terms in which $\sin \phi$ is involved, in which $\sin \phi \cos \phi$ is involved, in which $\sin 2\phi$ is involved and in which $\cos 2\phi$ is involved.

The third set of signals are those which are demodulated with respect to a periodic reference signal, here called the $-\sin \phi$ reference signal. This third set of signals is referred to as the "quadrature set" and are those which preserve all terms that involve $\sin \phi$ and rejects all others.

Once having developed these three sets of signals, a combining network is utilized to process the "in-phase" and "quadrature" sets of signals so as to derive certain of the aforementioned dynamic variables. The d.c. set of signals themselves define the remainder of the dynamic variables.

Thereafter, all of the dynamic variables are processed by a simple microprocessor so as to obtain the angular velocity and translational acceleration of the inertial measurement unit.

In summary, the subject processor takes signals from an inertial measurement unit, divides them into three categories, linearly combines "in-phase" and "quadrature" sets of signals and the combined signals plus the "d.c. set" signals provide the "dynamic" variables which are coupled to a microprocessor for computation of the angular velocity and translational acceleration of the inertial measurement unit.

In order to more fully describe the subject invention, one embodiment of the aforementioned inertial measurement unit is first described. This is followed by a description of the location of the transducers and their sensitive axes such that the processor can be described.

Figure 1:
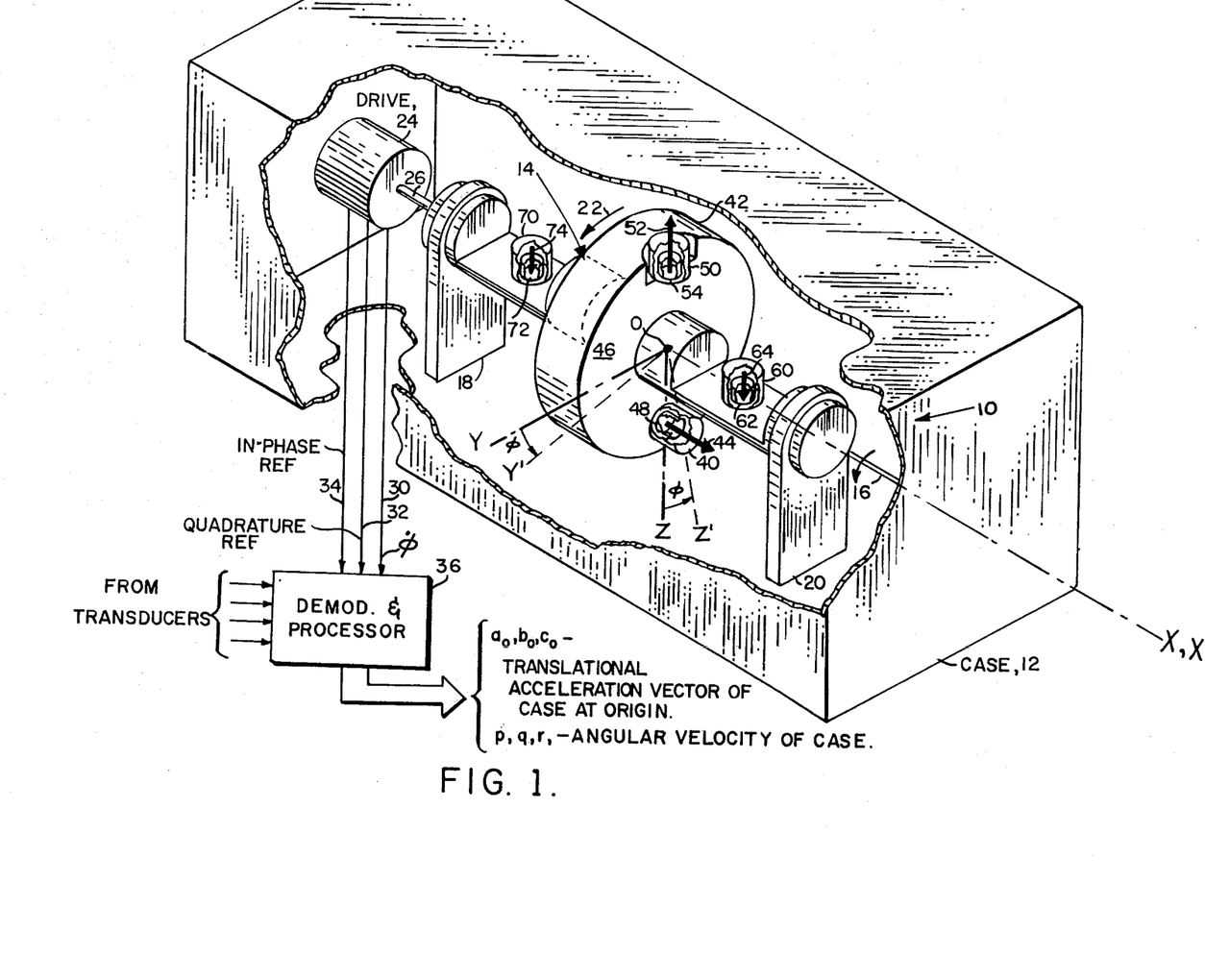
FIG. 1 is a diagrammatic illustration of a one rotor embodiment of the subject invention.

Referring now to FIG. 1, in the one embodiment the subject processor is utilized with an inertial measurement unit 10 which includes a case 12 and a rotor 14 having a longitudinal axis 16, with the rotor supported in case 12 via bearing supports 18 and 20. In this embodiment rotor axis 16, here x', is coextensive with the roll axis x of case 12, with the origins of the coordinate systems for the case and the rotor being the same as indicated. The coordinate frame for the case is illustrated by axes x, y, and z, with the coordinate frame of the rotor being indicated by axes x', y', and z'. Note that as the rotor rotates, the y'z' coordinate frame of the rotor rotates with respect to that of the case. The angular displacement of the y' and z' rotor axes with respect to the case axes y and z are indicated by $\phi$ with the direction of rotation in this case being in a clockwise direction as indicated by arrow 22. The rotor is driven by a conventional drive unit 24 which is mechanically connected to the rotor via linkage 26. Drive unit 24 has as its outputs electrical signals corresponding to the rotational speed at which the rotor is driven with respect to the case, $\dot{\phi}$, as well as developing a.c. in-phase and quadrature reference signals. These last-mentioned signals are the $\cos \phi$ and $-\sin \phi$ signals discussed above and are delivered over lines 30, 32, and 34 to a demodulation and processing unit 36, the outputs of which are vector components indicating the translational acceleration of the case at the origin and the angular velocity of the case.

In order to obtain these inertial parameters, four linear transducers are mounted on rotor 14 in the following manner: A transducer 40 is mounted on a portion 42 of the rotor such that a sensitive axis 44 is offset from the rotor axis and has its origin on the z' axis. The y'z' plane is defined by the face 46 of rotor portion 42 which includes the origin of both coordinate systems as a point in this plane. The accelerometer has a piezo-electric or other type linear active element 48 as illustrated such that its center of sensitivity lies in the plane established by face 46 and so that its sensitive axis is parallel to the axis of rotation.

Also mounted on rotor portion 42 is an accelerometer 50 having a sensitive axis illustrated by arrow 52 and is located such that the center of sensitivity of the active element 54 of the transducer lies in the plane established by face 46 and so that its sensitive axis is normal to the axis of rotation.

Mounted equidistantly on either side of the origin are transducers 60 and 70 having active elements 62 and 72 whose centers of sensitivity lie along the rotational axis of the rotor and whose axes of sensitivity are normal to the rotor axis as illustrated by arrows 64 and 74.

The outputs of these transducers are coupled to unit 36 as shown by conventional pickoff means (not shown).

Figure 2:
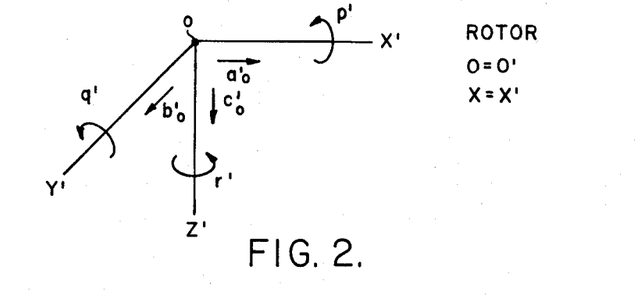
FIGS. 2 and 3 describe rotor and case coordinates and parameters respectively.
Figure 3:
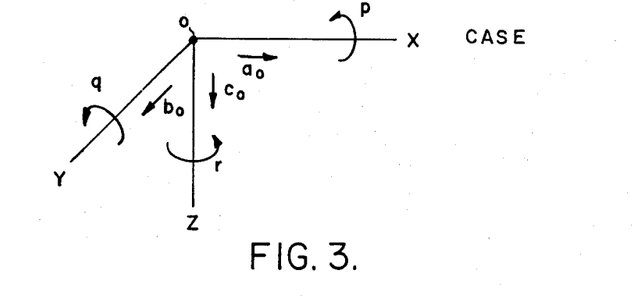

Referring to FIGS. 2 and 3, the coordinate frames for the rotor and case are illustrated, in which the primed quantities indicate rotor coordinate variables, whereas the unprimed quantities represent case coordinate variables. Rotation about either the x or the x' axis is noted by p or p'; about the z or z' axis by r or r'; and about the y or y' axis by q or q'. Translational acceleration of the origin along the x or x' axes is indicated by $a_o$ or $a_o'$; for the y or y' axes by $b_o$ or $b_o'$; and for the z or z' axes by $c_o$ or $c_o'$;

It will be appreciated that it is the purpose of unit 36 to obtain from the linear transducers, vector components $a_o$, $b_o$, and $c_o$, the linear translational acceleration vector of the case at the origin, and vector components p, q, and r, the angular velocity vector of the case.

Figure 4:
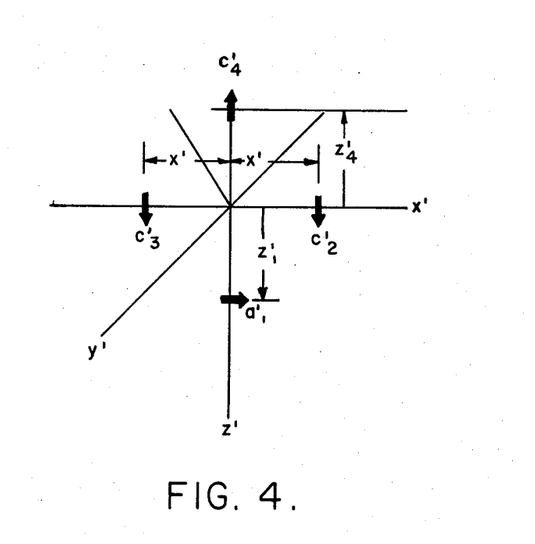
FIG. 4 is a diagram showing the location of the transducers for the unit of FIG. 1.

Referring to FIG. 4, the directions of the sensitivities of the transducers are illustrated along with the dimensions relative to the origin of the rotor coordinate frame.

It will be appreciated that the transducer 40 has an output labelled $a_1'$, whereas the outputs of transducers 60 and 70 have outputs labelled respectively $c_2'$ and $c_3'$. The outputs of these three transducers are a.c. signals, the processing of which will be described hereinafter. The output of transducer 50 is labelled $c_4'$, and its main function is to provide a d.c. signal from which is computed the rotational velocity of the rotor in inertial space, as opposited to the velocity of the rotor with respect to the case. The velocity of the rotor with respect to the case has already been defined as $\dot{\phi}$.

Figure 5:
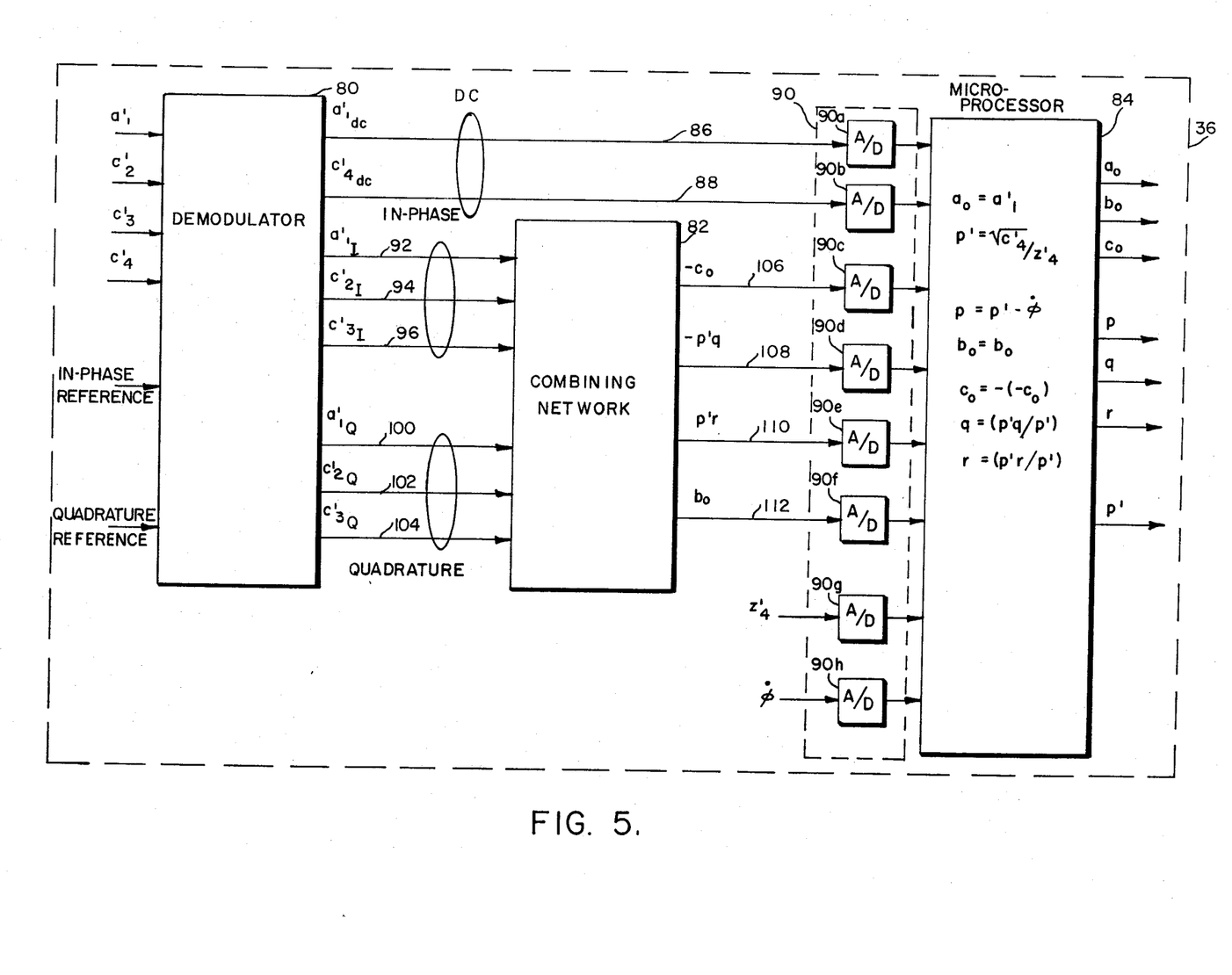
FIG. 5 is a block diagram of the demodulator and processor of FIG. 1.

Referring now to FIG. 5, demodulator and processing unit 36 is comprised in general of a demodulator 80, a combiner 82, and microprocessor 84. The inputs to the demodulator are $a_1'$, $c_2'$, $c_3'$, and $c_4'$ as well as the aforementioned in-phase and quadrature reference signals. From the demodulator are available d.c. set signals, in-phase set signals, and quadrature set signals as follows: (Note: all signals from the demodulator are direct current signals regardless of the set to which they belong).

The d.c. set signals are $a_{1I}'$, and $c_{4dc}'$ delivered over line 86 and 88 to a multichannel analog-to-digital conversion unit. Channels $90_a$ and $90_b$ are, respectively, used to condition the above signals for microprocessor 84.

The in-phase set signals $a_{1I}'$, $c_{2I}'$, $c_{3I}'$ are delivered over lines 92, 94, and 96 respectively to combining network 82, the operation of which will be described hereinafter.

The quadrature set signals $a_{1Q}'$, $c_{2Q}'$, and $c_{3Q}'$ are delivered over lines 100, 102, and 104 respectively to combining network 82. The outputs of the combining network are $-c_o$ delivered over line 106 through analog-to-digital converter channel $90_c$; p'q delivered over line 108 to analog-to-digital converter channel $90_d$; p'r delivered over line 110 to analog-to-digital converter channel $90_e$; and $b_o$ delivered over line 112 to analog-to-digital converter channel $90_f$. Other parameters delivered to the microprocessor are $z_4'$ which is the offset distance of transducer 50 and $\dot{\phi}$ which is the rotational velocity of the rotor with respect to case. These are converted to digital quantities of analog-to-digital converter channels $90_g$ and $90_h$ respectively. Alternatively, it will be appreciated that $z_4'$ is constant and may be programmed into the microcomputer.

Microprocessor 84 processes the incoming signals in accordance with the equations noted such that the outputs from the microprocessor are $a_o$, $b_o$, $c_o$, p, q, r, and p'. It will be appreciated that the outputs of the microprocessor uniquely specify the motion of the case in inertial space as regards both angular velocity and translational acceleration. With these quantities, two vectors are defined, which describe the motion of the case. These are useful in many inertial guidance system situations.

Figure 6:
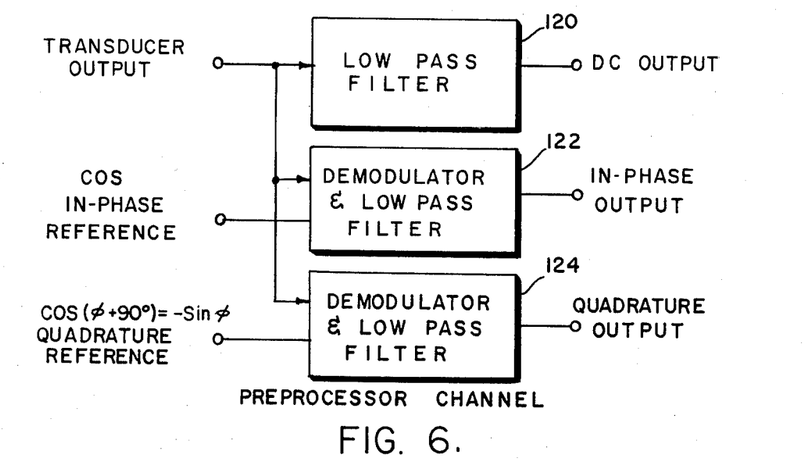
FIG. 6 is a block diagram of a portion of the demodulator of FIG. 5.
Figure 7:
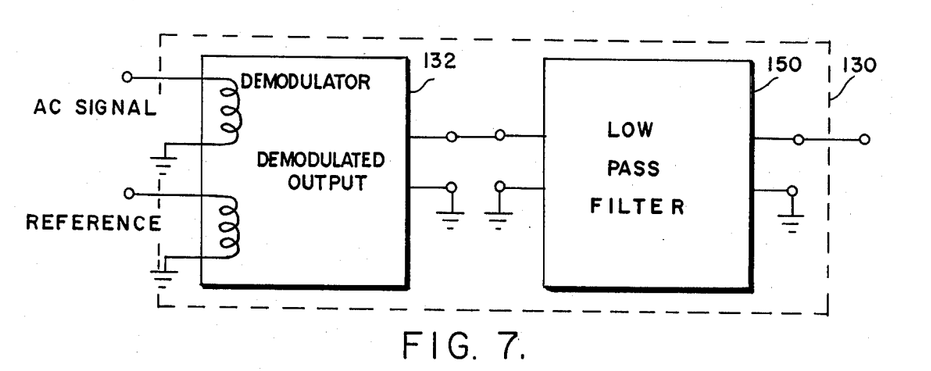
FIG. 7 is a block diagram of one of the demodulator/low pass filter units of FIG. 6.
Figure 8:
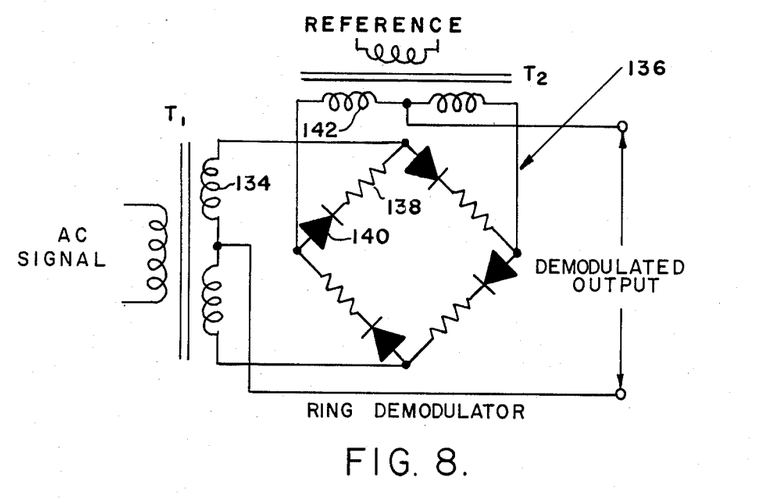
FIG. 8 is a schematic diagram of a ring demodulator suitable for use as the demodulator in FIG. 7.

Referring now to FIG. 6, the demodulator 80 of FIG. 5 includes a number of channels, the most complex of which is illustrated in FIG. 6. In this channel, a transducer output is coupled to a conventional low pass filter 120, an in-phase demodulator and low pass filter unit 122, and a quadrature demodulator and low pass filter unit 124. The low pass filter is conventional and provides the indicated d.c. signal set output. The in-phase demodulator and low pass filter 122 is fed with the in-phase reference signal delivered on line 34 of FIG. 1, whereas the quadrature demodulator and low pass filter 124 is fed with the quadrature reference signal from line 32, FIG. 1. Each demodulator and low pass filter unit, indicated by a dotted line 130 in FIG. 7, includes an a.c. signal input, which is the signal from the associated transducer, and a further reference, which is either the in-phase or quadrature reference. The demodulated output is applied from the demodulator to a low pass filter 150 which is conventional in design. Demodulator 132 may be a conventional ring demodulator as illustrated in FIG. 8 in which an a.c. signal from a transducer is coupled across a transformer T1 to a center tapped secondary 134 with the reference signal applied across transformer T2, also to a center tapped secondary 142. The secondaries of these transformers are applied to opposite points of a bridge circuit comprised of resistive elements 138 and diodes 140. The center taps from each of the transformers define the demodulated output.

As can be seen, for any given transducer, its output can be demodulated to give either d.c. set signals, in-phase set signals or quadrature set signals, all of which are direct current. By illustrating the most complex situation one can choose to ignore certain signal sets for any given transducer. Thus, each demodulator channel $a_o$
$b_o$
$c_o$
$pr-q$
$pq+r$
$p'q$
$p'r$ The variables are as described in connection with FIGS. 2 and 3. Once having arrived at these quantities, $a_o$, $b_o$, $c_o$, p, q and r are readily calculated with a simple microprocessor. How these quantities are derived and how they are used to obtain angular acceleration and translational velocity is now discussed.

The generalized equations for the acceleration at a point on a spinning body in terms of the coordinate frame for the spinning body is given by the matrix equation (1):

$$\begin{bmatrix} a_i' \\ b_i' \\ c_i' \end{bmatrix} = \begin{bmatrix} a_o \\ b_o\cos\phi \\ +c_o\sin\phi \\ -b_o\sin\phi \\ +c_o\cos\phi \end{bmatrix} + \begin{bmatrix} -(q^2+r^2) & [2p'q-(pq+\dot{r})]\cos\phi + [2p'r-(pr-\dot{q})]\sin\phi & -[2p'q-(pq+\dot{r})]\sin\phi + [2p'r-(pr-\dot{q})]\cos\phi \\ (pq+\dot{r})\cos\phi +(pr-\dot{q})\sin\phi & -(p'^2+\frac{q^2+r^2}{2}) + \frac{q^2-r^2}{2}\cos 2\phi + qr\sin 2\phi & -\dot{p}' - \frac{q^2-r^2}{2}\sin 2\phi + qr\cos 2\phi \\ -(pq+\dot{r})\sin\phi +(pr-\dot{q})\cos\phi & \dot{p}' - \frac{q^2-r^2}{2}\sin 2\phi + qr\cos 2\phi & -(p'^2+\frac{q^2+r^2}{2}) - \frac{q^2-r^2}{2}\cos 2\phi - qr\sin 2\phi \end{bmatrix} \begin{bmatrix} x_i' \\ y_i' \\ z_i' \end{bmatrix}$$

can be as complex as illustrated, with all the signal sets being available for each transducer. Which signals are chosen are as described in FIG. 5, and are applied either to the microprocessor or to the combining network illustrated in that figure. In the following section, prior to describing the operation of the combining network, there is presented a discussion of the signals from the transducers described in connection with FIGS. 1–4 which illustrates that linear combinations of these outputs result in quantities which can be quite easily combined and processed.

It is a feature of the subject invention that it was recognized that equation No. 1 can be made to yield three separate matrix type equations in which DC set signals, In-phase set signals and Quadrature set signals are broken out. Note, the $2\phi$ terms can be shown to be ignorable. This results in equations 2, 3, and 4:

DC Set Signals
$$\begin{bmatrix} a_i' \\ b_i' \\ c_i' \end{bmatrix} = \begin{bmatrix} a_o \\ 0 \\ 0 \end{bmatrix} + \begin{bmatrix} (q^2+r^2) & 0 & 0 \\ 0 & -(p'^2+\frac{q^2+r^2}{2}) & -\dot{p}' \\ 0 & \dot{p}' & -(p'^2+\frac{q^2+r^2}{2}) \end{bmatrix} \begin{bmatrix} x_i' \\ y_i' \\ z_i' \end{bmatrix} \quad (2)$$

In-Phase Set Signals
$$\begin{bmatrix} a_i' \\ b_i' \\ c_i' \end{bmatrix} = \begin{bmatrix} 0 \\ b_o \\ c_o \end{bmatrix} + \begin{bmatrix} 0 & 2p'q-(pq+\dot{r}) & 2p'r-(pr-\dot{q}) \\ pq+\dot{r} & 0 & 0 \\ pr-\dot{q} & 0 & 0 \end{bmatrix} \begin{bmatrix} x_i' \\ y_i' \\ z_i' \end{bmatrix} \quad (3)$$

Quadrature Set Signals
$$\begin{bmatrix} a_i' \\ b_i' \\ c_i' \end{bmatrix} = \begin{bmatrix} 0 \\ c_o \\ -b_o \end{bmatrix} + \begin{bmatrix} 0 & 2p'r-(pr-\dot{q}) & -2p'q+(pq+\dot{r}) \\ pr-\dot{q} & 0 & 0 \\ -(pq+\dot{r}) & 0 & 0 \end{bmatrix} \begin{bmatrix} x_i' \\ y_i' \\ z_i' \end{bmatrix} \quad (4)$$

LINEAR PROCESSING FROM THE GENERALIZED EQUATIONS

As discussed hereinbefore there is a unique set of "dynamic" variables, which completely describes the motion of the inertial measurement unit and at the same time, are linear combinations of the transducer outputs. These are:

$p'^2$

For an instrument with one rotor and 4 transducers, the DC set signals, In-phase Set signals, and Quadrature Set signals are given by the following set of equations:
DC Set Signals:

$a'_{1dc} = a_o$ (5)

$c'_{2dc} = 0$ (6)

$c'_{3dc} = 0$ (7)

$$c'_{4dc} = (p'^2 + \frac{q^2 + r^2}{2})z'_4 \quad (8)$$

In-Phase Set Signals

$$a'_{1I} = [2p'r - (pr - \dot{q})]z'_1 \quad (9)$$

$$c'_{2I} = c_o + x'(pr - \dot{q}) \quad (10)$$

$$c'_{3I} = c_o - x'(pr - \dot{q}) \quad (11)$$

$$c'_{4I} = c_o \quad (12)$$

Quadrature Set Signals

$$a'_{1Q} = [-2p'q + (pq + \dot{r})]z'_1 \quad (13)$$

$$c'_{2Q} = -b_o - x'(pq + \dot{r}) \quad (14)$$

$$c'_{3Q} = -b_o + x'(pq + \dot{r}) \quad (15)$$

$$c'_{4Q} = -b_o \quad (16)$$

By evaluation of equations 5–16 one can evaluate certain important dynamic variables as linear combinations of transducer outputs to obtain equations 17–23. Note in equation (8) it is possible to ignore the $(q^2+r^2)/2$ term.

$$a_o = [a_1'] \, DC \quad (17)$$

$$p'^2 + \frac{q^2 + r^2}{2} \approx p'^2 = \left[ + \frac{c_4'}{z_4'} \right] DC \quad (18)$$

$$b_o = -\left[ \frac{c_2' + c_3'}{2} \right] \text{Quad} \quad (19)$$

$$c_o = \left[ \frac{c_2' + c_3'}{2} \right] \text{In-Phase} \quad (20)$$

$$pr - \dot{q} = \left[ \frac{c_2' - c_3'}{2x'} \right] \text{In-Phase} \quad (21)$$

$$pq + \dot{r} = -\left[ \frac{c_2' - c_3'}{2x'} \right] \text{Quad} \quad (22)$$

$$p'q = -\tfrac{1}{2}\left[ \frac{a_1'}{z_1'} + \frac{c_2' - c_3'}{2x'} \right] \text{Quad} \quad (22)$$

$$p'r = \tfrac{1}{2}\left[ \frac{a_1'}{z_1'} + \frac{c_2' - c_3'}{2x'} \right] \text{In-Phase} \quad (23)$$

Equations 17–23 are the "dynamic" variables which both uniquely define the movement of the inertial measurement unit in inertial space and do this as linear combinations of transducer outputs. It will be noted that the quantities $b_o$ and $c_o$ as well as the quantities $p'q$ and $p'r$ are expressable in terms of simple algebraic expressions, the terms of which are easily ascertained from either the placement of the transducers or the transducer's outputs.

By rearranging equations 5–23, all of the translational accelertion and rotational velocity vectors are obtained as follows:

DC $$a_o = a_1' \quad (24)$$

$$p' = \sqrt{+c_4'/z_4'} \quad (25)$$

$$p = p' - \dot{\phi} \quad (26)$$

IN-PHASE $$r = \frac{-1}{2p'}\left[ \frac{a'}{z_1'} + \frac{c_2' - c_3'}{2x'} \right] \quad (27)$$

$$c_o = \frac{c_2' + c_3'}{2} \quad (28)$$

QUADRATURE $$q = \frac{-1}{2p'}\left[ \frac{a_1'}{z_1'} + \frac{c_2 - c_3'}{2x'} \right] \quad (29)$$

$$b_o = -\frac{c_2' + c_3'}{2} \quad (30)$$

For equation 26, it can be shown due to the coordinate frame definition, that $\dot{\phi} = p' - p$ or $p = p' - \dot{\phi}$. Thus, $\dot{\phi}$, $a'_1$, $c'_2$, $c'_3$, $c'_4$ are measured directly and $a_o$, $b_o$, $c_o$, p, q, and r are inferred from the measurements. It is these linear equations which give rise to the simple network of FIG. 9 and the simple processing in a general purpose computer or the microprocessor of FIG. 5.

Note that $-c_o$, $-p'q$, $p'r$ and $b_o$ can be generated by a simple combining network. Once acquiring these quantities, equation (27) can be written as follows:

$$r = (p'r)/p' \quad (31)$$

and equation (29) can be written as follows:

$$q = -(p'q)/p' \quad (32)$$

Thus, all inertial parameters as given by equations (24), (25), (26), (28), (30), (31) and (32) are extremely easily derived by simple combining and processing.

When the processor utilized is a general purpose computer such as the IBM 360 computer, the Fortran program for implementing equations 24, 25, 26, 28, 30, 31, and 32 is given in the following table:

TABLE I

FORTRAN PROGRAM

| Symbol Equivalents | |
|---|---|
| Text | Fortran |
| $a_o$ | Aφ |
| $a_1'$ | A/P |
| $p'$ | PP |
| $c_4'$ | C4P |
| $z_4'$ | Z4P |
| p | P |
| φ | PH1D |
| $b_o$ | Bφ |
| $c_o$ | Cφ |
| $-c_o$ | CφM |
| q,r | Q,R |
| $p'q$, $p'r$ | PPQ, PPR |

| PROCESSOR ALGORITHM | | |
|---|---|---|
| Aφ | = | A/P |
| PP | = | (C4P/Z4P)**0.5 |
| P | = | PP - PH1D |
| Bφ | = | Bφ |
| Cφ | = | CφM |
| Q | = | PPQ/PP |
| R | = | PPR/PP |

COMBINER NETWORK & PROCESSING

Figure 9:
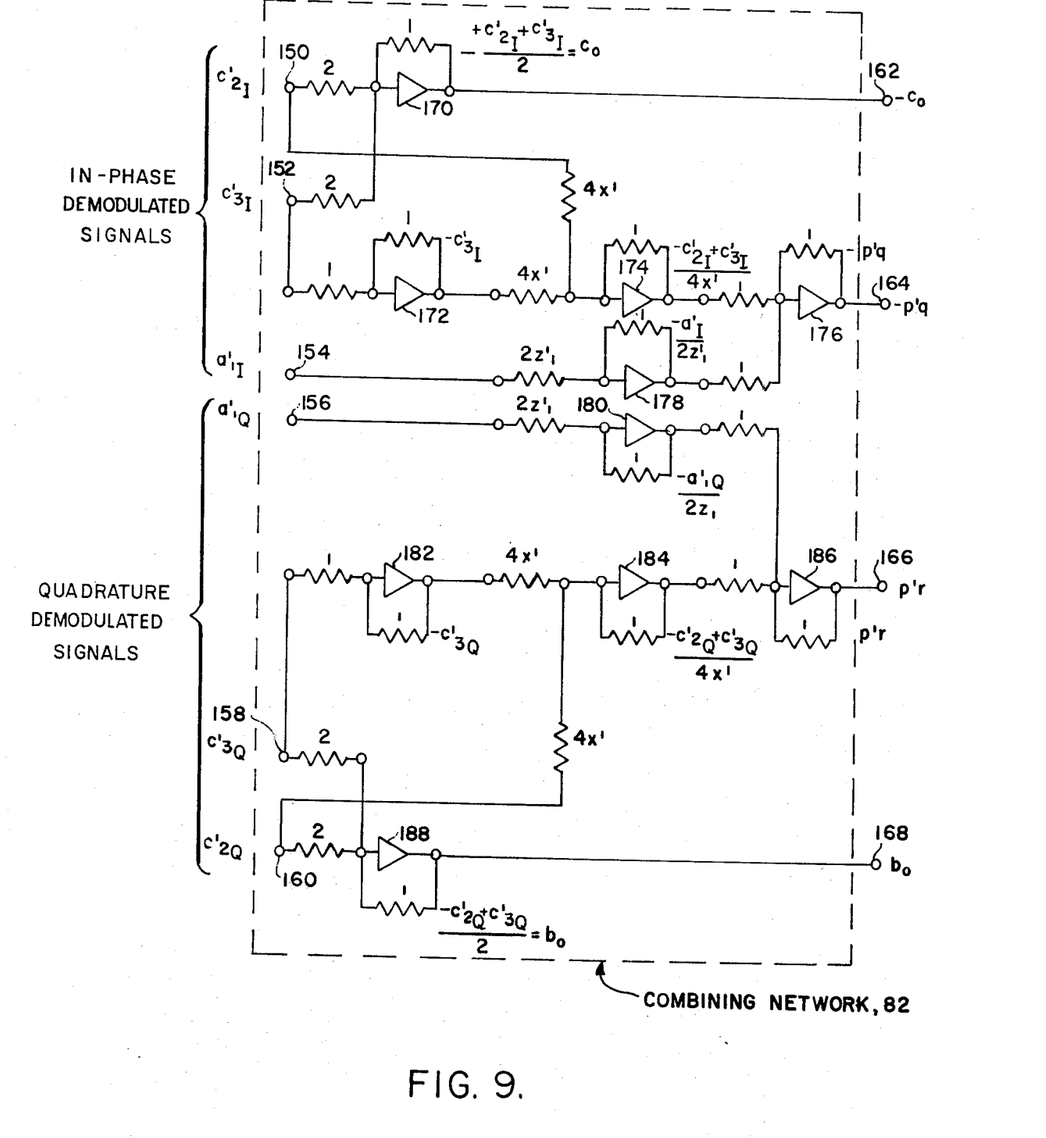
FIG. 9 is a schematic diagram of the combining network of FIG. 5.

Having derived the simple linear equations and referring now to FIG. 9, 10 the quantities $-c_o$, $-p'q$, $p'r$, and $b_o$ are derived through combining network 82 so that they may be utilized in the conventional microprocessor of FIG. 5 as follows. Combining network 82 has input terminals 150, 152, 154, 156, 158, and 160. Output terminals 162, 164, 166, and 168 with the indicated quantities being applied to the input terminals and the indicated quantities being available at the output terminals. This combining network also has operational amplifiers 170–188 which are utilized in the combining process.

In order to derive $-c_o$ it will be appreciated that $$-c_o = \frac{c'_{2I} + c'_{3I}}{2}.$$

This is generated by applying the outputs from terminals 150 and 152 through resistive networks which are unnumbered with the exception of their relative values which appear directly adjacent to the resistive element. As can be seen in the case of deriving $-c_o$, the relative values of the resistive elements are 2 and 2 which are combined together at the input of operational amplifier 170 with a feedback resistor having a relative value of 1 between the input and the output terminal of the operational amplifier. This, in essence, derives the $-c_o$ quantity.

$p'q$ is derived via the use of the $c'_{3I}$ signal which is applied to operational amplifier 172 with the feedback circuits arranged such that $-c'_{3I}$ is obtained. This is, in turn, applied to operational amplifier 174 through a resistive network having a relative value of 1 along with the $c'_{2I}$ signal from terminal 150 through a resistive network also having a relative value of 1. An input resistor of the network having a value corresponding to $4x'$ is also provided such that the output of operational amplifier 174 is $$\frac{-c'_{2I} + c'_{3I}}{4x'}.$$

This is applied through another resistive element having a relative value of 1 to operational amplifier 176. The in-phase $a'_{1I}$ signal available at terminal 154 is applied to operational amplifier 178 through a resistive element having a value of $2z'_1$ with a feedback resistor having a value of 1, thereby, to derive the quantity $-a'_{1I}/2z'_1$. This, in turn, is applied through a resistive element having a relative value of 1 to the input of operational amplifier 176, thereby to derive the $p'q$ output at terminal 164. This describes the in-phase dynamic variables derived from the signal set and the dynamic variables derived from the signal set are derived similarly, such that the quadrature portion of the network is not described in detail.

TWO ROTOR EMBODIMENT

Figure 10:
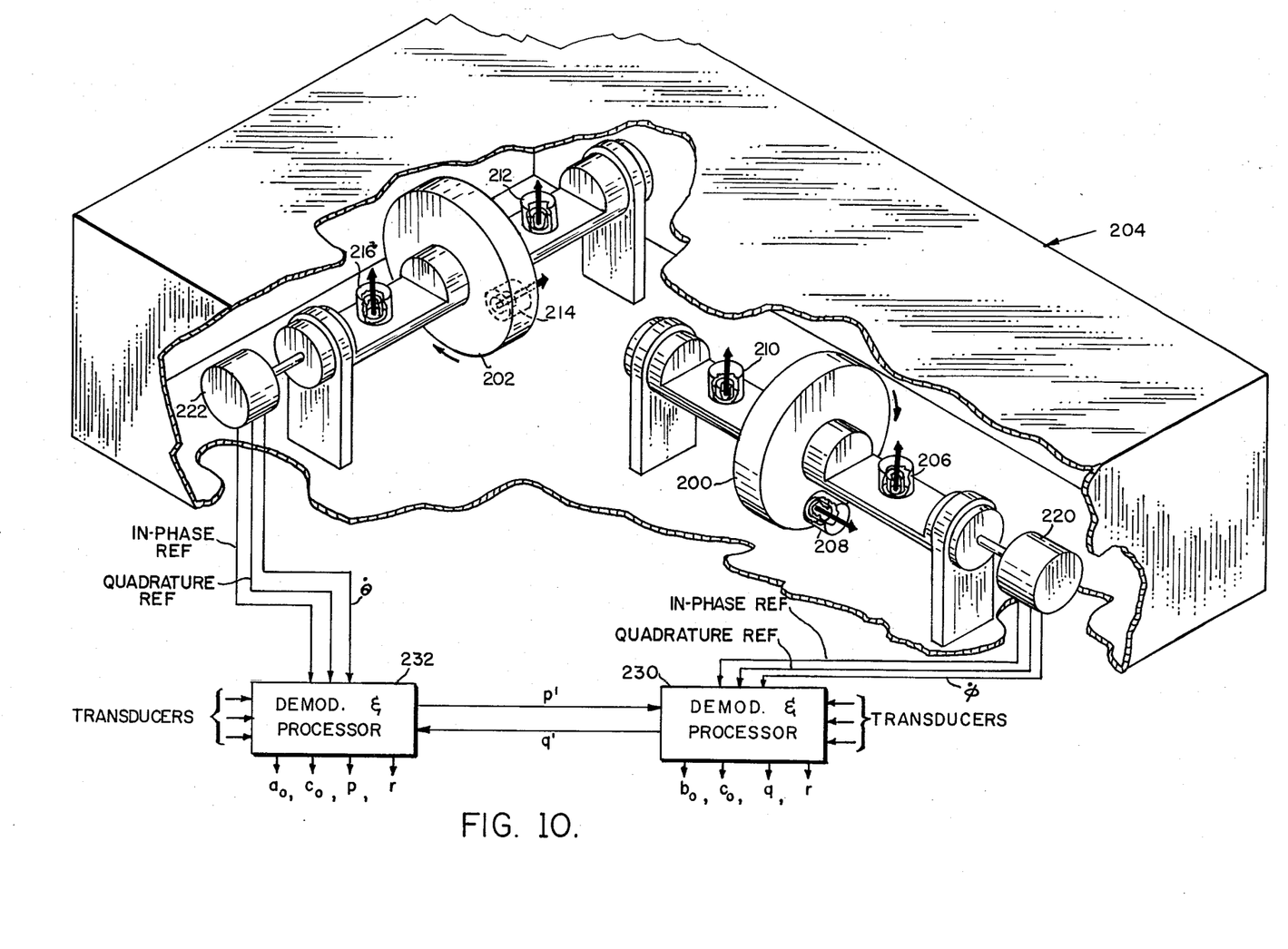
FIG. 10 illustrates diagrammatically a two-rotor unit.

Referring now to FIG. 10, it will be appreciated that two orthogonal rotor systems 200 and 202 may be mounted in a case 204 such that, while the rotors lie in the same plane, they are orthogonal one to the other, and further, that in this embodiment, the transducer utilized to obtain the rotational velocity of each rotor in inertial space is omitted. The velocities of the rotors in inertial space are obtained through calculations which will be described hereinafter, which involve only a.c. measurements; that is to say, only measurements from transducers 206–216. It will be appreciated that these transducers are mounted in all respects the same as those indicated in FIG. 1, with the exception of the omitted transducers. Rotor unit 200 is driven by drive unit 220 which provides in-phase and reference signals as well as its velocity, $\dot{\phi}$, relative to the case as was the case in FIG. 1. Rotor 202 is driven by drive unit 222 which provides in-phase and quadrature signals as references and the angular velocity of this rotor with respect to the case, which in this case is $\dot{\theta}$.

In this case the outputs for the on-axis transducers for rotor 202 are $a'_2$ and $a'_3$, whereas the off-axis transducer output is $b'_1$.

The signals from these two orthogonally-oriented units are applied to demodulator and processor 230 and 232, respectively, which have the outputs as indicated, with demodulator and processor 230 receiving the $q'$ signal from demodulator 232 and demodulator and processor 232 providing the $p'$ signal to demodulator and processor 230. In this manner all of the requisite signals become available without the reliance on d.c. signal processing. How this is accomplished, at least with respect to $p'$, is discussed in terms of an algebraic method and an iterative processing method. In this system the requisite signals may be albebraic processing applied to a demodulator which, in this case, obtains the in-phase and quadrature components of these signals by utilization of the demodulator means described hereinbefore. The processing with respect to rotor unit 200 is exactly the same as that described hereinbefore such that the combining network is given the same reference character, that is, 82, as before, and the quantities available therefrom are exactly the same as described hereinbefore. The only thing that is absent is a value for $p'$ which may be obtained by the following equations in an algebraic computation:

$$p' = \dot{\phi} + p \tag{33}$$

$$p = \frac{D - A + \dot{\phi}q}{\dot{\phi}} \tag{34}$$

where $$D = q'p = \frac{1}{2}\left[\frac{b_1'}{x_1'} + \frac{a_2' - a_3'}{2y'}\right] \text{in-phase} \tag{35}$$

$$A = p'q = \frac{1}{2}\left[\frac{a_1'}{z_1'} + \frac{c_2' - c_3'}{2x'}\right] \text{quad} \tag{36}$$

and q is derived from $$(\dot{\phi})q^2 + (\dot{\theta}\dot{\phi} + D - A)q - A\dot{\theta} = 0 \tag{37}$$

Note: D is the term from the $\theta$ rotor which allows the computation of $p'$. All other processing may be done as before. It will be appreciated in solving equation 33 by use of equations 34–37, that $\dot{\phi}$ and $\dot{\theta}$ are measureable quantities. The quantity A is merely $p'q$ which is derived from combining network 82 as the signal on line 108. The only other quantity necessary to derive is q and this may be derived from solving quadratic equation 37 in the usual manner.

Thus, D and A may be derived through combining matrices whereas $\dot\phi$ and $\dot\theta$ are measurable quantities. q is derived from solving a quadratic equation which may be done in a well-known fashion. However, the solving of a quadratic equation is, in essence, a time consuming process when done by conventional computer methods. Alternatively, the entire computation for deriving the vector components may be accomplished by iterative processing done through microprocessor 244 of FIG. 11.

Figure 11:
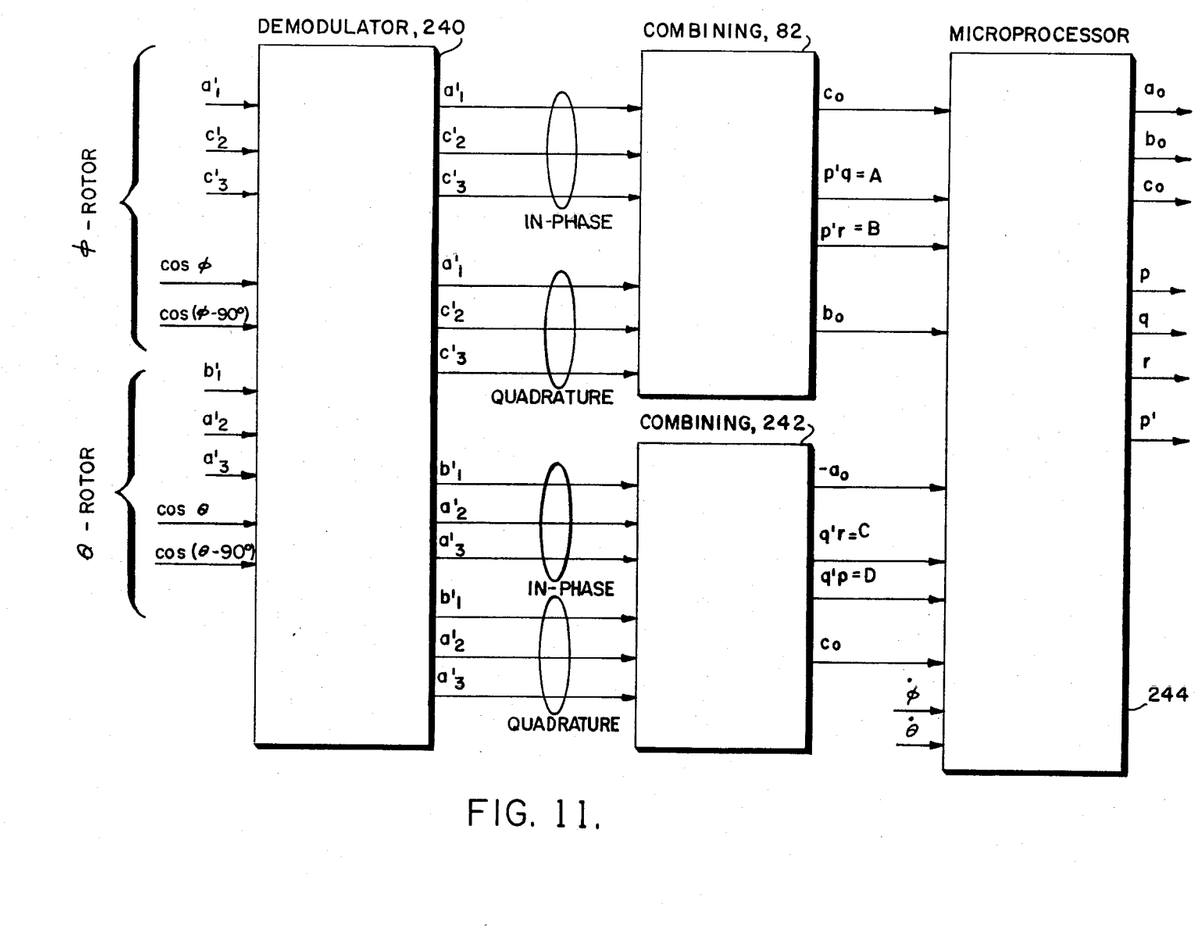
FIG. 11 illustrates in block form a demodulator and processor for use in the two-rotor embodiment.

Referring to FIG. 11, Iterative Processing, all transducer signals are coupled to a demodulator 240, which has the indicated inputs and outputs. The demodulation is as described hereinbefore. Note that the inputs to and outputs from combining matrix 82 are as described in connection with FIGS. 5 and 9. In this combining matrix the quantities A and B are derived as illustrated. Note that A is described by equation 36, whereas B is described by equation 23.

In FIG. 11 combining matrix 242 derives the analog quantities to those derived by combining matrix 82 in the sense that $-a_o$, q'r, q'p, and $c_o$ are derived in a similar fashion. In this case:

$$q'r = \frac{1}{2}\left[\frac{b_1'}{x_1} + \frac{a_2' - a_3'}{2y'}\right] = C \quad \text{Quad} \tag{38}$$

$$q'p = \frac{1}{2}\left[\frac{b_1'}{x_1'} + \frac{a_2' - a_3'}{2y'}\right] = D \quad \text{In-Phase} \tag{39}$$

$$-a_o = -\left[\frac{a_2' - a_3'}{2}\right] \quad \text{In-Phase} \tag{40}$$

$$c_o = -\left[\frac{a_2' - a_3'}{2}\right] \quad \text{Quad} \tag{41}$$

The algorithm for the microprocessor is a simple one in which an initial value is assumed for p' and a final value obtained for p' is then substituted back at Step 3, equation 42 of the microprocessor algorithm illustrated below, and the process repeated:

TABLE II

| Step | Microprocessor Algorithm | |
|---|---|---|
| 1. | Assume a magnitude for p' | |
| 2. | p←p' − $\phi$ | (42) |
| 3. | q←A/p' (from Step 1, 8) | (43) |
| 4. | r←B/p' (from Step 1, 8) | (44) |
| 5. | q'←$\dot\theta$ + q (from Step 3) | (45) |
| 6. | r←C/q' (from Step 5) | (46) |
| 7. | p ←D/q' (from Step 5) | (47) |
| 8. | p'←$\dot\phi$ + p (from Step 7) | (48) |
| 9. | return to Step 3 | (49) |
| Where | A = equation 36 (from combining network 82) | |
| | B = equation 23 (from combining network 82) | |
| | C = equation 38 (from combining network 242) | |
| | D = equation 39 (from combining network 242) | |

As before, in the case when the aforementioned general purpose computer is utilized as the processor, the Fortran program for implementing the algorithm of Table II is given in the following table:

TABLE III

| Fortran Program Symbol | | |
|---|---|---|
| Equivalents | Text | Fortran |
| | p, q, r | P, Q, R |
| | p', q', r' | PP, QP, RP |
| | $\phi$, $\theta$, $\psi$ | PHI D, THET D, PSI D |
| | Assumed magnitude of p' | PPZ |
| | Iterative Algorithm | |
| | 1 PP = PPZ | |
| | 2 P = PP − PHI D | |
| | 3 Q = A/PP | |
| | R = B/PP | |
| | QP = THET D + Q | |
| | R = C/QP | |
| | P = D/QP | |
| | PP = PHI D + P | |
| | Go to 3 | |

It will be noted that the vector components p, q, and r are obtained respectively from Steps 7, 3, and either 4 or 6. Additionally, the value of p' is available at Step 8. Thus, the microprocessor algorithm defined thus far processes the appropriate signals to obtain the angular velocity of the case.

As to translational acceleration, the translational acceleration components are derived directly from the combining networks with $a_o$ being merely the product of $-a_o$ from combining network 242 with −1. $b_o$ is obtained from combining network 82 directly and $c_o$ is derived from combining network 242 directly. Thus, all inertial parameters of interest are obtainable at the output of microprocessor 244 without the necessity of utilizing a fourth transducer and its d.c. output to specify the rotational velocity of the rotor in inertial space.

It will be noted that the r term is derived twice either from B/p' or C/q'. This is also true for $a_o$ and $c_o$. This redundancy, while not entirely necessary, points to a 3 rotor system in which the three rotors are in three mutually orthogonal directions. Indeed, for complete redundancy, either the in-phase or quadrature signals to combining network 242 are used in the three rotor embodiment to provide yet a third check on a value for r.

The foregoing has assumed no offset between the origins of the two rotors. Obviously, the two rotors cannot occupy the same place at the same time. The offset in the x direction, $x_{qr}$, of the origin of the originally described rotor from the orthogonal rotor yields a correction as follows:

Assuming the coordinates of rotor 200 are $x_{qr}$, 0, 0 then it can be shown that:

$$a_{qr} = a_o - x_{qr}(q^2 + r^2) \tag{50}$$

$$b_{qr} = b_o + x_{qr}(pr + \dot r) \tag{51}$$

$$c_{qr} = c_o + x_{qr}(pr + \dot q) \tag{52}$$

thus:

$$p' = \dot\phi + p \tag{53}$$

$$b_o = -\left[\frac{c_2' + c_3'}{2} - x_{qr}\frac{c_2' - c_3'}{2x'}\right] \quad \text{Quad} \tag{54}$$

$$c_o = \left[\frac{c_2' + c_3'}{2} - x_{qr}\frac{c_2' - c_3'}{2x'}\right] \quad \text{In-Phase} \tag{55}$$

-continued $$pr - \dot{q} = \left[\frac{c_2' - c_3'}{2x'}\right] \text{In-Phase} \quad (56)$$

$$pq + \dot{r} = -\left[\frac{c_2' - c_3'}{2x'}\right] \text{Quad} \quad (57)$$

$$p'q = -\frac{1}{2}\left[\frac{a_1'}{z_1'} + \frac{c_2' - c_3'}{2x'}\right] \text{Quad} = A \quad (58)$$

$$p'r = \frac{1}{2}\left[\frac{a_1'}{z_1'} + \frac{c_2' - c_3'}{2x'}\right] \text{In-Phase} = B \quad (59)$$

from which all other variables may be computed as above. Note, only $b_o$ and $c_o$ change with the offset.

CORRECTION FOR NON-IDEAL TRANSDUCERS

The above treatment has assumed ideal transducers, e.g. those whose centers of sensitivity are precisely known, whose sensitive axes are exactly aligned and in which transverse sensitivity for each transducer is zero. However, no such ideal linear transducers exist and these will, of necessity, be corrections which must be applied.

Because of the linear combining of transducer outputs, compensation can be accomplished by measuring certain terms of the combining matrix and inverting it to provide the needed corrections. The inverted matrix is used to specify the values for a corresponding network, thereby to eliminate the errors between ideal and real transducers.

Assuming $a''_i$, $b''_i$, $c''_i$ to be the output of a non-ideal transducer in the indicated directions and $a'_i$, $b'_i$, $c'_i$ to be the output of the corresponding ideal transducer then:

$$\begin{bmatrix} a_i'' \\ b_i'' \\ c_i'' \end{bmatrix} = \begin{bmatrix} 1 & K_{ay} & K_{az} \\ -K_{bx} & 1 & K_{bz} \\ K_{ax} & K_{cy} & 1 \end{bmatrix} \begin{bmatrix} 1 & \epsilon_z & -\epsilon_y \\ -\epsilon_z & 1 & \epsilon_x \\ \epsilon_y & -\epsilon_x & 1 \end{bmatrix} \begin{bmatrix} a_i' \\ b_i' \\ c_i' \end{bmatrix} \quad \begin{bmatrix} a_i' \\ b_i' \\ c_i' \end{bmatrix} = \begin{bmatrix} 1 & k_{ay} & k_{ax} \\ k_{bx} & 1 & k_{bz} \\ k_{cx} & k_{cy} & 1 \end{bmatrix} \begin{bmatrix} a_i' \\ b_i' \\ c_i' \end{bmatrix} \quad (60)$$

Transverse sensitivity | Angular Misalignment | Cross-Coupling

As to transverse sensitivity, for example, $K_{ay}$ is the sensitivity of the transducer in the "a" direction due to excitation in the "y" direction.

As to angular misalignment, for example, $\epsilon_z$ is a small rotation about the z axis of the sensitive axis of the transducer.

The cross-coupling matrix is derived as follows and assumes that $K \times \epsilon$ terms, the second order terms, may be ignored $$k_{ay} = K_{ay} + \epsilon_z \quad (61)$$
$$k_{az} = K_{az} - \epsilon_y \quad (62)$$
$$k_{bx} = K_{bx} - \epsilon_z \quad (63)$$
$$k_{bz} = K_{bz} + \epsilon_x \quad (64)$$
$$k_{cx} = K_{cx} + \epsilon_y \quad (65)$$
$$k_{cy} = K_{cy} - \epsilon_x \quad (66)$$

Ignoring the $q^2 + r^2$ terms, the exact equations for processing the transducer outputs are as follows:

DC
$$\begin{bmatrix} a_o \\ p'^2 \\ \dot{p}' \end{bmatrix} = \begin{bmatrix} 1 & -k_{ay1}y_1' - k_{az1}z_1' & -k_{ay1}z_1' + k_{az1}y_1' \\ k_{cx2} - k_{cy2}y_2' - z_2' & -k_{cy2}z_2' + y_2' \\ k_{cx4} - k_{cy4}y_4' - z_4' & -k_{cy4}z_4' + y_4' \end{bmatrix}^{-1} \begin{bmatrix} \phi_1'' \\ \phi_2'' \\ \phi_4'' \end{bmatrix} \quad (67)$$

AC
$$\begin{bmatrix} p'q \\ p'r \\ pq + \dot{r} \\ pr - \dot{q} \\ b_o \\ c_o \end{bmatrix} = \begin{bmatrix} 2y_1' & 2z_1' & -y_1' + k_{ay1}x_1' & -z_1' + k_{az1}x_1' & k_{cy1} & k_{az1} \\ 2k_{cx2}y_2' & 2k_{cx2}z_2' & -k_{cx2}y_2' + k_{cy2}x_2' & -k_{cx2}z_2' + x_2' & k_{cy2} & 1 \\ 2k_{cx3}y_3' & 2k_{cx3}z_3' & -k_{cx3}y_3' + k_{cy3}x_3' & -k_{cx3}z_3' + x_3' & k_{cy3} & 1 \\ -2z_1' & 2y_1 & z_1' - k_{az1}x_1' & -y_1' + k_{ay1}x_1' & -k_{az1} & k_{ay1} \\ -2k_{cx2}z_2' & 2k_{cx2}y_2' & k_{cx2}z_2' - x_2' & -k_{cx2}y_2' + k_{cy2}x_2' & -1 & k_{ay2} \\ -2k_{cx3}z_3' & 2k_{cx3}y_3' & k_{cx3}z_3' - x_3' & -k_{cx3}y_3' + k_{cy3}x_3' & -1 & k_{cy3} \end{bmatrix}^{-1} \begin{bmatrix} (\phi_1'')_I \\ (\phi_2'')_I \\ (\phi_3'')_I \\ (\phi_1'')_Q \\ (\phi_2'')_Q \\ (\phi_3'')_Q \end{bmatrix} \quad (68)$$

where the I and Q nomenclature refers to in-phase and quadrature components. Since every term of the above matrix can be measured and an inverse matrix prepared, $a_o$, $b_o$, and $c_o$ are uniquely determined and p, q, and r can be inferred as before through linear equations.

Once having developed the matrix equations of 67 and 68, it is a simple matter to obtain the elements of these matrices which, when inverted, and multiplied by the outputs of non-ideal transducers, yields the correct result.

In order to obtain the individual elements in the matrix, given an imperfect instrument, e.g. one with non-ideal transducers, a series of measurements are made, which measurements correspond to the elements of the matrix. These measurements are then compared with the predicted values for the ideal case. The differences between the ideal outputs and the measured outputs constitute the elements of the matrix to be inverted. When this matrix is inverted, cross-coupling errors of all kinds are cancelled from the system and the non-ideal or imperfect instrument is error-corrected without repositioning of any of the transducers.

Although preferred embodiments of the invention have been described in considerable detail for illustrative purposes, many modifications will occur to those skilled in the art. It is therefore desired that the protection afforded by Letters Patent be limited only by the true scope of the appended claims.

I claim:

1. A processor for an inertial measurement unit that includes a number of linear acceleration transducers on a single rotor, at least one of said transducers mounted on said rotor such that the sensitive axis of said transducer is offset from and parallel to the rotor axis, and at least one other transducer having a sensitive axis, the center of sensitivity of which is located on the rotor axis, comprising:
- means for demodulating the outputs of said transducers; and
- means for processing the demodulated outputs of said transducers so as to obtain the translational acceleration and angular velocity of said unit in three mutually orthogonal directions, said processing means including means for deriving a set of dynamic variables which define said translational acceleration and said angular velocity in terms of linear combinations of selected demodulator outputs.

2. The processor of claim 1 wherein said dynamic variable deriving means includes a linear combining matrix.

3. The processor of claim 1, wherein said inertial measurement unit includes a drive unit which produces in-phase and quadrature reference signals, and wherein said demodulating means includes means utilizing said in-phase and quadrature reference signals for demodulating the output signals from selected transducers such that selected demodulated output signals represent in-phase and quadrature components of the corresponding original transducer output signals and wherein said dynamic variable demodulating means includes a linear combining matrix and means for coupling said selected in-phase and quadrature demodulated output signals to said linear combining matrix.

4. The processor of claim 1 wherein said rotor rotates about an axis denoted by $x'$, wherein the angular velocity about three mutually orthogonal axes $x'$, $y'$, and $z'$ defining the rotor coordinate system is denoted by $p'$, $q'$ and $r'$, wherein the angular velocity of the unit about three mutually orthogonal axes $x$, $y$ and $z$ defining the unit coordinate system is denoted by $p$, $q$, and $r$, wherein the origins of the coordinate systems and the $x$ and $x'$ axes are coincident, wherein $a_o$, $b_o$, and $c_o$ denote translational acceleration of said unit along axes $x$, $y$ and $z$ respectively, said set of dynamic variables including $a_o$, $b_o$, $c_o$, $p'^2$, $pr-\dot{q}$, $pq+\dot{r}$, $p'q$ and $p'r$.

5. The processor of claim 1 wherein said rotor rotates about an axis denoted by $x'$, wherein the angular velocity about three mutually orthogonal axes $x'$, $y'$ and $z'$ defining the rotor coordinate system is denoted by $p'$, $q'$ and $r'$, wherein the angular velocity of the unit about three mutually orthogonal axes $x$, $y$ and $z$ defining the unit coordinate system is denoted by $p$, $q$, and $r$, wherein the origins of the coordinate systems and the $x$ and $x'$ axes are coincident, wherein $a_o$, $b_o$ and $c_o$ denote translational acceleration of said unit along axes $x$, $y$ and $z$ respectively, wherein four transducers are utilized, wherein the output of said at least one transducer is $a'_{1dc}$, wherein the output of another of said transducers is $c_{4dc}$, wherein the transducer whose output is $c'_{4dc}$ is located at a predetermined distance from the axis of the rotor with a sensitive axis normal thereto, wherein the speed of said rotor with respect to said unit is $\dot{\phi}$, and wherein said dynamic variable deriving means includes means for obtaining the quantities $a'_{1dc}$, $c'_{4dc}$, $-c_o$, $-p'q$, $p'r$, $b_o$, $\dot{\phi}$ and said predetermined distance.

6. The processor of claim 5 wherein said processor includes a pair of transducers maintained equidistantly by an amount $x$ to either side of the plane which contains the transducer whose output is $c'_{4dc}$, said pair of transducers having outputs $c'_2$ and $c'_3$, respectively, having parallel sensitive axes normal to the axis of the rotor and having centers of sensitivity coincident with the rotor axis, said at least one transducer being offset by a distance $z'_1$, and said dynamic variable deriving means including means for combining the outputs of said transducers in accordance with the following formulas:

$$-c_o = -\left[\frac{c_2' + c_3'}{2}\right] \text{ In-Phase}$$

$$b_o = -\left[\frac{c_2' + c_3'}{2}\right] \text{ Quadrature}$$

$$-p'q = \tfrac{1}{2}\left[\frac{a_1'}{z_1'} + \frac{c_2' - c_3'}{2x'}\right] \text{ Quadrature}$$

$$p'r = \tfrac{1}{2}\left[\frac{a_1'}{z_1'} + \frac{c_2' - c_3'}{2x'}\right] \text{ In-Phase}$$

7. The processor of claim 1 wherein said dynamic variable deriving means includes a number of linear combining matrices.

8. A processor for an inertial measurement unit that includes a number of transducers mounted on a rotor, comprising:
- means for demodulating the outputs of said transducers to produce d.c. signals; and
- means for processing said d.c. signals so as to obtain the translational acceleration and angular velocity of said unit in three mutually orthogonal directions, said processing means including means for deriving a set of dynamic variables which define said translational acceleration and said angular velocity in terms of selected uncombined demodulated transducer outputs, linear combinations of selected demodulator outputs, and the rotational velocity of said rotor with respect to said unit.

9. The processor of claim 8 wherein said processing means includes a linear combining matrix.

10. A processor for an inertial measurement unit that includes a number of transducers mounted on a rotor, comprising:
- means for processing the outputs of transducers so as to obtain the translational acceleration and angular velocity of said unit in three mutually orthogonal directions, said processing means including means for linearly combining the demodulated outputs of selected transducers thereby to permit the derivation of dynamic variables which define said translational acceleration and said angular velocity.

11. The processor of claim 10 wherein said linear combining means includes a linear combining matrix.

12. A processor for an inertial measurement unit that includes mutually orthogonal rotors, with each of said rotors having transducers mounted thereon, comprising:
- means for demodulating the outputs of said transducers; and
- means for processing the demodulated outputs of said transducers so as to obtain the translational acceleration and angular velocity of said unit in three mutually orthogonal directions, said processing means including means for deriving a set of dynamic variables which define said translational acceleration and said angular velocity in terms of linear combinations of selected demodulated transducer outputs, and the rotational velocities of said rotors with respect to said unit.

13. The processor of claim 12 wherein a first rotor rotates about an axis denoted by x', wherein the angular velocity about three mutually orthogonal axes x', y' and z' defining said first rotor coordinate system is denoted by p', q' and r', wherein the angular velocity of the unit about three mutually orthogonal axes x, y, and z defining the unit coordinate system as denoted by p, q, and r, wherein the origins of the coordinate systems for said first rotor and the x' and x axes are coincident, wherein a second rotor rotates about an axis orthogonal to said x' axis, wherein a, b, c denote translational acceleration along axes x, y and z respectively, wherein a', b' and c' denote translational acceleration along axes x', y' and z', respectively, wherein said first rotor includes three linear acceleration transducers, the outputs of which are $a'_1$, $c'_2$ and $c'_3$, wherein the angular velocity of said first rotor with respect to the case is $\dot{\phi}$, wherein a second of said rotors includes three linear acceleration transducers having outputs $b'_1$, $a'_2$, and $a'_3$, wherein the rotational velocity of said second rotor with respect to said unit is $\dot{\theta}$, and wherein said means for deriving a set of dynamic variables include combining network means operably connected to said demodulating means for deriving the quantities $c_o$, p', p'q, p'r, $b_o$, $-a_o$, q'r and q'p, where $a_o$, $b_o$ and $c_o$ denote the translational acceleration of said unit in inertial space.

14. In a system for measuring inertial parameters utilizing a unit containing a rotor and transducers carried thereon, a method for compensating for the non-ideal nature and alignments of the transducers while at the same time deriving the translational acceleration and the angular velocity of the unit comprising the steps of:
   providing a matrix from demodulated outputs from selected non-ideal transducers carried on said rotor;
   subtracting from this matrix the values which an ideal matrix should have, on an element by element basis;
   inverting the resulting matrix; and
   utilizing the inverted matrix to produce a linear combining matrix for the processing of signals from selected ones of said non-ideal transducers.

15. A processor for an inertial measurement unit that includes a number of transducers on a single rotor, at least one of said transducers mounted on said rotor such that the sensitive axis of said transducer is offset from and parallel to the rotor axis and at least one other transducer having a sensitive axis, the center of sensitivity of which is located on the rotor axis, comprising:
   means for processing the outputs of said transducers so as to obtain the translational acceleration and angular velocity of said unit in three mutually orthogonal directions, said processing means including means for deriving the dynamic variables which define said translational acceleration and said angular velocity as linear combinations of demodulated transducer outputs.

16. In combination: an inertial measurement unit including a number of transducers on a single rotor, at least one of said transducers mounted on said rotor such that the sensitive axis of said transducer is offset from and parallel to the rotor axis and at least one other transducer having a sensitive axis, the center of sensitivity of which is located on the rotor axis, and
   means for processing the outputs of said transducers so as to obtain the translational acceleration and angular velocity of said unit in three mutually orthogonal directions.

17. The combination of claim 16 wherein said processing means includes means for deriving dynamic variables which define said translational acceleration and said angular velocity as linear combinations of demodulated transducer outputs.

* * * * *